(12) United States Patent
Becker et al.

(10) Patent No.: US 12,308,889 B2
(45) Date of Patent: May 20, 2025

(54) MODULAR QUANTUM INTERCONNECT FOR MICROWAVE AND TELECOMMUNICATIONS WAVELENGTHS

(71) Applicant: Board of Trustees of Michigan State University, East Lansing, MI (US)

(72) Inventors: Jonas Nils Becker, Lansing, MI (US); Shannon Singer Nicley, Lansing, MI (US); Johannes Pollanen, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 304 days.

(21) Appl. No.: 18/172,441

(22) Filed: Feb. 22, 2023

(65) Prior Publication Data
US 2024/0171289 A1 May 23, 2024

Related U.S. Application Data

(60) Provisional application No. 63/312,893, filed on Feb. 23, 2022.

(51) Int. Cl.
| | |
|---|---|
| *H04B 10/70* | (2013.01) |
| *G02F 1/21* | (2006.01) |
| *G02F 1/225* | (2006.01) |
| *H01P 3/00* | (2006.01) |
| *H01P 7/00* | (2006.01) |

(52) U.S. Cl.
CPC ............. *H04B 10/70* (2013.01); *G02F 1/212* (2021.01); *G02F 1/2255* (2013.01); *H01P 3/003* (2013.01); *H01P 7/00* (2013.01)

(58) Field of Classification Search
CPC ....................................................... H04B 10/70
See application file for complete search history.

(56) References Cited

U.S. PATENT DOCUMENTS

| | | | | |
|---|---|---|---|---|
| 2004/0109633 | A1* | 6/2004 | Pittman | B82Y 10/00 385/16 |
| 2013/0301333 | A1* | 11/2013 | Gilbert | H04L 9/0852 365/106 |
| 2018/0322921 | A1* | 11/2018 | Brown | C04B 35/486 |
| 2022/0269974 | A1* | 8/2022 | Bhaskar | G06N 10/70 |

OTHER PUBLICATIONS

Heshami, Khabat, et al., "Quantum memories: emerging applications and recent advances." Journal of Modern Optics 63.20 (2016): 2005-2028; arXiv:1511.04018. (Year: 2016).*

(Continued)

*Primary Examiner* — Nathan M Cors
(74) *Attorney, Agent, or Firm* — Harness, Dickey & Pierce, PLC

(57) ABSTRACT

A quantum interconnect module includes a quantum memory that has a dual arm interferometer embedded therein. The dual arm interferometer has a first arm within a crystal and a second arm within the crystal. The interferometer is coupled to a photon source. A microwave resonator has a waveguide coupled to a microwave source. The microwave resonator is coupled to the first arm of the quantum memory. The interferometer generates an output based on the microwave source.

19 Claims, 6 Drawing Sheets

(56) References Cited

OTHER PUBLICATIONS

Williamson et al., "Magneto-Optic Modulator with Unit Quantum Efficiency," Phys. Rev. Lett. 113, 203601, Nov. 14, 2014. (Year: 2014).*
Development of Quantum InterConnects (QuICs) for Next-Generation Information Technologies 2019.
Quantum memories: emerging applications and recent advances Mar. 16, 2016.
Perspectives on quantum transduction Mar. 17, 2020.
Experimental demonstration of memory-enhanced quantum communication Mar. 23, 2020.
Optical wavelength conversion of quantum states with optomechanics Nov. 9, 2010.
Cavity-enhanced Raman heterodyne spectroscopy infor microwave to optical signal conversion Sep. 9, 2019.
Interfacing superconducting qubits and telecom photons via a rare-earth-doped crystal Aug. 8, 2014.
High-speed noise-free optical quantum memory Apr. 10, 2018.
Quantum repeaters with photon pair sources and multimode memories May 11, 2007.
ORCA—towards an integrated noise-free quantum memory 2017.
Efficient, low noise, mode-selective quantum memory Jun. 2019.
Optimal coherent filtering for single noisy photons Nov. 20, 2019.
Invited review article: Single-photon sources and detectors Jul. 27, 2011.
Electron Spin Coherence in Optically Excited States of Rare-Earth Ions for Microwave to Optical Quantum Transducers Jun. 17, 2019.
Large conditional single-photon cross-phase modulation 2016.
Optical quantum computing Dec. 7, 2007.
Highly-efficient quantum memory for polarization qubits in a spatially-multiplexed cold atomic ensemble Jan. 25, 2018.
Single-photon Kerr nonlinearities do not help quantum computation Jun. 7, 2006.
Anisotropic rare-earth spin ensemble strongly coupled to a superconducting resonator Apr. 8, 2013.
Magnetic field resilient superconducting fractal resonators for coupling to free spins Dec. 18, 2012.
Experimental demonstration of quantum effects in the operation of microscopic heat engines Mar. 20, 2019.
Magnetictensors for theandstates of Feb. 29, 2008.
Coherence time of over a second in a telecom-compatible quantum memory storage material Sep. 11, 2017.
Hybrid quantum circuit with a superconducting qubit coupled to a spin ensemble Nov. 21, 2011.
Simple non-galvanic flip-chip integration method for hybrid quantum systems Apr. 29, 2019.
Investigation of static electric dipole-dipole coupling induced optical inhomogeneous broadening in Eu3+:Y2SiO5 2004.
Ultranarrow Optical Inhomogeneous Linewidth in a Stoichiometric Rare-Earth Crystal Dec. 15, 2016.
Microwave to optical photon conversion via fully concentrated rare-earth-ion crystals Jun. 21, 2019.
Optical lifetime and linewidth studies of the transition in: A potential material for quantum memory applications 2013.
Quantum processing with ensembles of rare-earth ions in a stoichiometric crystal Jan. 9, 2020.
Mid-infrared spectroscopy of erbium doped chloride laser crystals Aug. 18, 1997.
Caloric and magnetic properties of two compounds having predominantly magnetic dipole-dipole interactions: DyCl3•6H2O and ErCl3•6H2O 1973.
Magnetic field resilient high kinetic inductance superconducting niobium nitride coplanar waveguide resonators Feb. 2, 2021.
Micro-patterning of NdFeB and SmCo magnet films for integration into micro-electro-mechanical-systems 2009.
Exchange coupling and magnetic properties of Nd2Fe14B/Co nanocomposite thin films 2003.
Enhanced magnetic properties of Nd—Fe—B thin films crystallized by heat treatment 2003.
Perpendicular magnetic anisotropy in NdFeB thin films Apr. 15, 1999.
Phonon-mediated quasiparticle poisoning of superconducting microwave resonators Dec. 7, 2017.
Campbell, P., "Permanent Magnet Materials and their Applications," Cambridge University Press, Cambridge, 1994.

* cited by examiner

MODULAR QUANTUM INTERCONNECT FOR MICROWAVE AND TELECOMMUNICATIONS WAVELENGTHS

CROSS-REFERENCE TO RELATED APPLICATION

This application claims the benefit of U.S. Provisional Application No. 63/312,893, filed on Feb. 23, 2022. The entire disclosure of the above application is incorporated herein by reference.

TECHNICAL FIELD

The present disclosure relates quantum circuits, and more specifically to modules used for quantum circuits that incorporate microwave control to allow entanglement with other modules.

BACKGROUND

This section provides background information related to the present disclosure which is not necessarily prior art.

Research in the field of quantum information processing (QIP) and communication technologies has undergone a rapid and sustained growth over the past decades and many pioneering experiments demonstrating the feasibility of such technologies have been performed in a variety of platforms. The large diversity of emerging quantum technologies, each with unique strengths and weaknesses, reveals the need for modularity to scale up to truly useful numbers of hundreds or thousands of error-corrected logical qubits for local quantum computation, widespread distributed quantum networking and key distribution, or quantum-enhanced sensing. Hence, a quantum interconnect (QuIC), that is a scalable technology which can connect modular quantum systems to form larger networks, is a crucial, yet so far lacking, component of a successful future quantum ecosystem.

In the quantum information community an ideal QuIC should combine a communication interface, a quantum buffer or memory, an entanglement source, a quantum converter and a quantum transducer.

The communication interface between individual components or modules of a quantum information processing (QIP) system can be separated by short (i.e. on the same chip) or large, potentially global, distances. This can for example be a microwave (MW) transmission line or optical fiber. Due to their comparably low losses, optical channels, especially in the infrared telecom bands, are preferred. Telecom compatibility also simplifies the integration in and coexistence with classical telecommunications infrastructure already deployed today and which will continue to be used for most applications.

The quantum buffer (QB) or quantum memory (QM) may be connected to the communication interface and can be used to coherently store quantum information (QI) to synchronize operations between modules or distribute it over long distances in quantum repeater schemes.

Ideally the system may also provide an entanglement source which can be used to create entanglement between individual modules, potentially aided by additional components. For example, this can be accomplished by creating entanglement between quantum memories via heralded photon absorption from single-photon sources connected to the QuIC. A quantum converter to change between different qubit encoding schemes, for example polarization or time bin bases for photons.

A quantum transducer can be used to connect disparate qubit technologies such as spins, photons, or microwave-based systems.

A number of devices realizing individual aspects of the above-mentioned functionalities have been demonstrated or proposed over the past years. This includes the demonstration of quantum memory and transduction in a variety of platforms such as trapped atoms and ions, atomic vapors, various solid-state systems and optomechanical platforms. However, a QuIC combining all these functionalities in a single modular and telecom-compatible platform remains elusive to date, as most platforms do not fulfill the physical prerequisites to enable all these functionalities simultaneously and no QuIC is commercially available so far. For example, the silicon vacancy in diamond has proven to be an excellent spin-photon interface with an electronic structure allowing for built-in millisecond QM, capable of breaking the repeaterless quantum key rate-bound. However, it lacks other functionalities such as direct compatibility with telecom technologies without the use of additional quantum frequency conversion or qubit encoding capabilities. In contrast, optomechanical transduction schemes are expected to be able to reach unit transduction efficiency but lack other capabilities such as QM. One of the most promising platforms for a multi-functional QuIC are rare-earth doped crystals which have been studied extensively for photon-echo based QM as well as transduction applications via cascaded MW-to-optical/Optical-to-MW frequency conversion using off-resonant three-wave mixing in A- or V-type level configurations. However, due to the necessary detuning from resonance and cascaded emission and re-absorption, these schemes suffer from low efficiencies, even in dense ensembles with cavity enhancement ($\eta=10^{-5}$ demonstrated). Alternatively, telecom-compatible memory-assisted transduction via a controlled reversible inhomogeneous broadening (CRIB) protocol in $Er^{3+}$ has been proposed but not demonstrated, as initialization of this QM via optical pumping proves to be extraordinarily difficult in $Er^{3+}$ due to an unfavorable ratio of ground and excited state lifetimes.

SUMMARY

This section provides a general summary of the disclosure, and is not a comprehensive disclosure of its full scope or all of its features.

A quantum interconnect (QuIC) technology consists of scalable modular devices which act as a common communications bus for other quantum systems to form larger quantum networks of varying size. The QuIC proposed here combines a communication interface at telecommunications wavelengths with a broadband quantum buffer, offering a low-loss optical link and storage/synchronization of quantum information at telecom wavelengths. The system can further serve as a quantum repeater for heralded generation, storage, and distribution of photonic entanglement. Moreover, the single-modeness of the quantum buffer enables coherent filtering and buffering as well as temporal mode manipulation for high-dimensional encoding of quantum information. Finally, by coupling the photonic buffer to an electron spin degree of freedom, the system can offer memory-assisted optically-heralded distribution of microwave-microwave entanglement and quantum state transfer between remote microwave systems via a hybrid microwave/optical nonlinearity. This enables interfacing of microwave-controlled quantum technologies such as a variety of spin qubits or superconducting qubits. In one aspect of the disclosure, a quantum interconnect module includes a quantum memory that has a dual arm interferometer embedded therein. The dual arm interferometer has a first arm within a crystal and a second arm within the crystal. The interferometer is coupled to a photon source. A microwave resonator has a waveguide coupled to a microwave source. The microwave resonator is coupled to the first arm of the quantum memory. The interferometer generates an output based on the microwave source.

In a further aspect of the disclosure, a method includes communicating a first photon into a first quantum memory having a first dual arm interferometer. The first dual arm interferometer comprises a first arm and a second arm formed within a crystal. The method further includes controlling a first microwave resonator comprising a first waveguide coupled to a first microwave source and the first arm of the quantum memory, and generating a first output at the first interferometer based the first microwave source.

Each module may consist of a solid-state host crystal containing rare earth ions carrying half-integer electron spin (Kramers-type ions). The crystal is embedded in an optical Mach-Zehnder interferometer, one arm of which is coupled to a microwave resonator. In one implementation of the device this can be a macroscopic loop-gap resonator and the interferometer is realized via free-space optical access and standard-free space or fiber optics components. In another implementation of the device, the optical interferometer is integrated via an on-chip waveguide material deposited onto or within the rare-earth crystal or onto a separate substrate onto which the rare-earth crystal can be placed (flip-chip). In this implementation, the microwave resonator is also integrated as a planar device in the form of a superconducting coplanar waveguide (CPW) resonator fabricated onto the rare-earth crystal, the optical waveguiding layer, or a separate substrate. Two active regions of the crystal have the two arms of the interferometer formed therein.

The QuIC is based on a four-level ladder scheme of electronic levels in the rare earth crystal where levels 1, 2, 3, 4 have increasing energies. Levels 1 and 2 or preferably level 3 and 4 are electron spin sublevels which are split apart in an external magnetic field. The transition between level 1 and 2 or preferably levels 3 and 4 is a microwave transition whereas the other transitions are optical transitions. The system of levels 1, 2, 3 (or 2, 3, 4) connected via two optical transitions forms an optical quantum buffer. A "signal" photon, ideally in one of the telecommunication bands, for example the telecom C-band (1530-1565 nm) applied to the lower optical transition can be read into this buffer via off-resonant two-photon absorption, aided by the application of a strong classical "control" field applied to the upper optical transition which can be anywhere in the optical spectrum. A variety of control field wavelength options may exist in each type of rare-earth ion depending on the choice of electronic states. This process creates a coherent excitation between state 1 and 3 (or 2 and 4) such that the atomic ensemble stores the signal in a collective coherent excitation which can be read out again by applying a second "control" pulse within the coherence time of the buffer. Memory-assisted quantum state transfer capabilities between remote microwave photons via the optical link is achieved by coupling a microwave photon inside a cavity to the stationary excitation of the optical QB via the microwave transition between states 3 and 4 (or 1 and 2). The interaction of the QB with the MW photon results in a phase shift of the optical photon via an AC Stark shift. A hybrid CNOT gate is implemented by operating the QB in a dual-rail configuration with the two rails being the two arms of the interferometer. If a π phase shift is applied to one arm by the presence of a MW photon in the cavity the output mode of the optical photon is swapped projecting the system into a Bell state of occupied/unoccupied microwave cavity mode and optical interferometer output modes. The Bell state may be referred to as an EPR pair. Entanglement of remote modules and consecutive quantum state transfer (teleportation) can then be accomplished by performing a joint Bell state measurement on the optical photons retrieved from two distant QuIC modules, projecting the joint system in a common Bell state.

In contrast to other platforms, this system enables all desired QuIC functionalities in a single architecture rather than having to engineer and connect multiple components to achieve the desired features with larger technical complexity and loss. This QuIC is inherently compatible with a variety of different quantum systems operating in the telecom C-band and microwave regime. The quantum buffer is inherently noise free, thermally initialized, and of GHz bandwidth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1A:
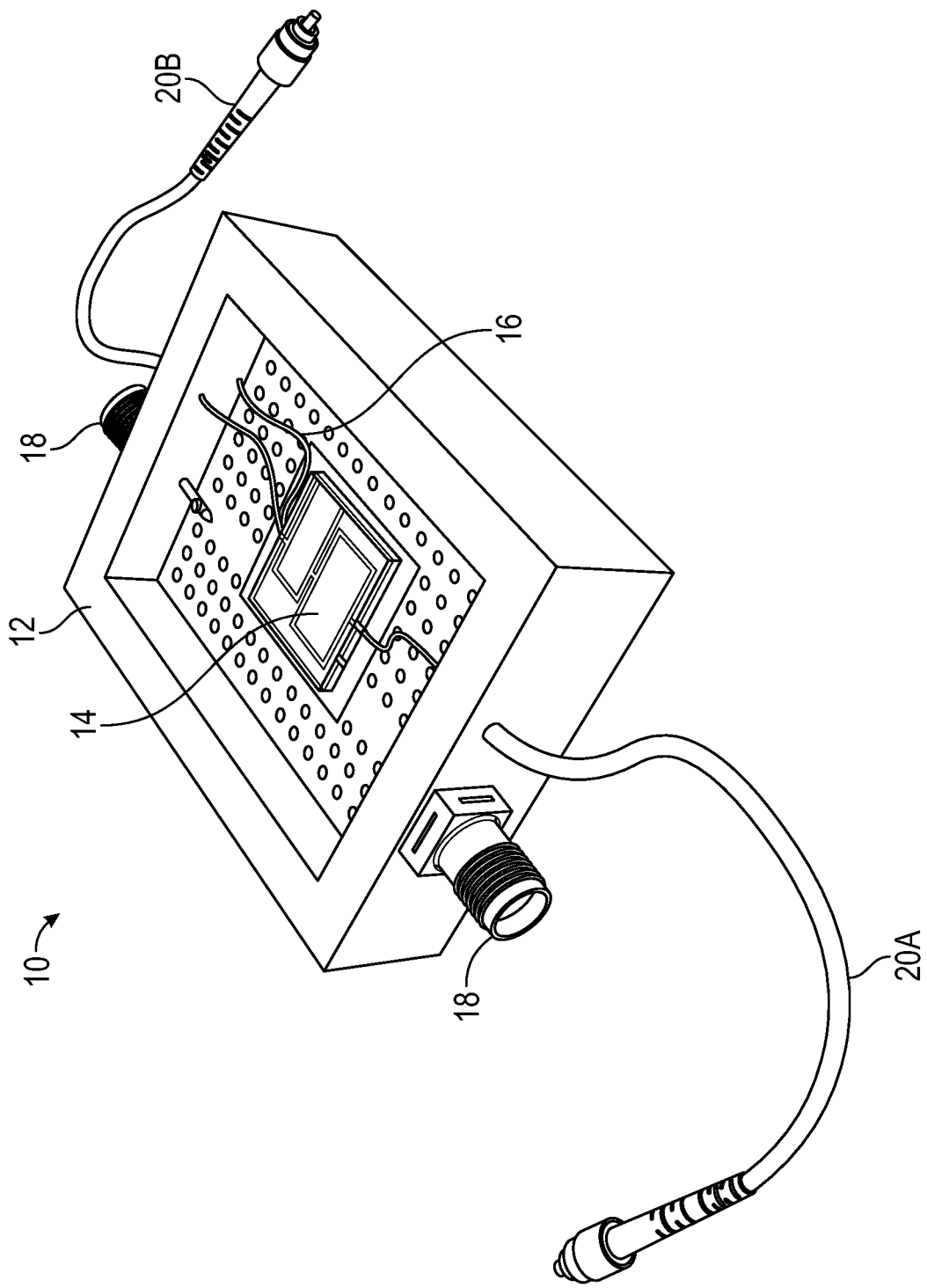
FIG. 1A is a representation of a quantum module according to the present disclosure.

Example embodiments will now be described more fully with reference to the accompanying drawings.

A quantum interconnect (QuIC) described below combines telecom wavelength communications with a broadband quantum buffer (QB) or quantum memory (QM), offering a low-loss optical link and QB at telecom wavelengths as well as a MW interface. In the following quantum memory and quantum buffer are interchangeable. This system can further serve as a quantum repeater for heralded generation, storage, and distribution of photonic entanglement as well as asymmetric Bell state measurements. Moreover, the single-modeness of the QB enables coherent filtering and buffering as well as temporal mode manipulation for high-dimensional photonic qudit encoding. Finally, by coupling the photonic QB to an electron spin degree of freedom, the system can offer memory-assisted optically-heralded distribution of microwave-microwave entanglement and quantum state transfer between remote microwave-based quantum systems. By using the heralded photonic entanglement as a resource rather than physically sending a transduced photon across the link, the present system can outperform traditional cascaded emission/absorption-based protocols.

In contrast to other platforms, this system enables all desired QuIC functionalities in a single architecture rather than having to engineer and connect multiple components to achieve the desired features with larger technical complexity and loss. The QuIC set forth below is inherently compatible with a variety of different quantum systems operating in the telecom C-band, for example. It consists of two or more individual modules, connected via a telecom photonic link and optical switching network. For example, this enables direct coupling of telecom SPDC sources or telecom quantum dots as potential single photon sources to create heralded photonic remote entanglement and to use the QuIC modules as input buffers for synchronization, converting or coherent filtering of photonic qubits for all-optical quantum processors based on integrated telecom photonic circuits.

Combining telecom-compatibility with various QB capabilities and memory-assisted optically-heralded distribution of microwave-microwave entanglement and quantum state transfer is unique to the QuIC and allows a variety of quantum systems to unite under a common standardized quantum bus to create a diverse hybrid quantum ecosystem. In some potential future applications a more specialized QuIC could be developed based on a subset of these functionalities to enhance a particular performance metric. The QuIC has the flexibility needed to satisfy this type of specialization and a QuIC developed at this stage should be as versatile as possible to be able to adapt to the rapidly evolving quantum landscape and so that its functionalities do not dictate the quantum systems or protocols used in a future quantum ecosystem.

A QuIC for microwave-based qubits and quantum devices is set forth that operates in the telecom C band based on a quantum memory-assisted hybrid microwave/optical single-photon level nonlinearity.

The QuIC is implemented in a solid-state ensemble of rare-earth ions carrying a non-zero electron spin in their ground/excited state levels (Kramers ions) and which are embedded stoichiometrically or as dopants in a suitable host crystal. It offers an optical communication interface with GHz bandwidth in the telecom C-band. It can be used to store and synchronize quantum information or distribute photonic entanglement with the aid of telecom single-photon sources such as spontaneous parametric down conversion (SPDC) sources. Due to its optical mode-selectivity, it can also double as quantum converter.

The device can be leveraged to achieve efficient memory-assisted optically-heralded distribution of microwave entanglement and quantum state transfer for optical interfacing of superconducting qubits or other microwave-controlled spin qubits. In contrast to previously explored cascaded transduction schemes which use a cascade of optical-to-microwave and microwave-to-optical frequency, the present system uses a microwave/optical hybrid nonlinearity and heralded telecom photon storage to accomplish the entanglement/state transfer without physically converting photons. Doing so adds robustness and eliminates many of the inefficiencies of cascaded transduction schemes. Moreover, the present system is inherently noise-free while there is an inherent trade-off between transduction efficiency and added noise in previous schemes.

Referring now to FIG. 1A, a quantum module 10 is disposed in a housing 12 that surrounds or partially surrounds a rare-earth doped quantum memory (QM) 14. The quantum memory 14 is disposed on a substrate and has coaxial microwave (MW) lines 18 and a fiber-based optical input channel 20A and a fiber based optical output channel 20B that are disposed through the housing 12. The quantum module 10 is explained in more detail below.

Figure 1B:
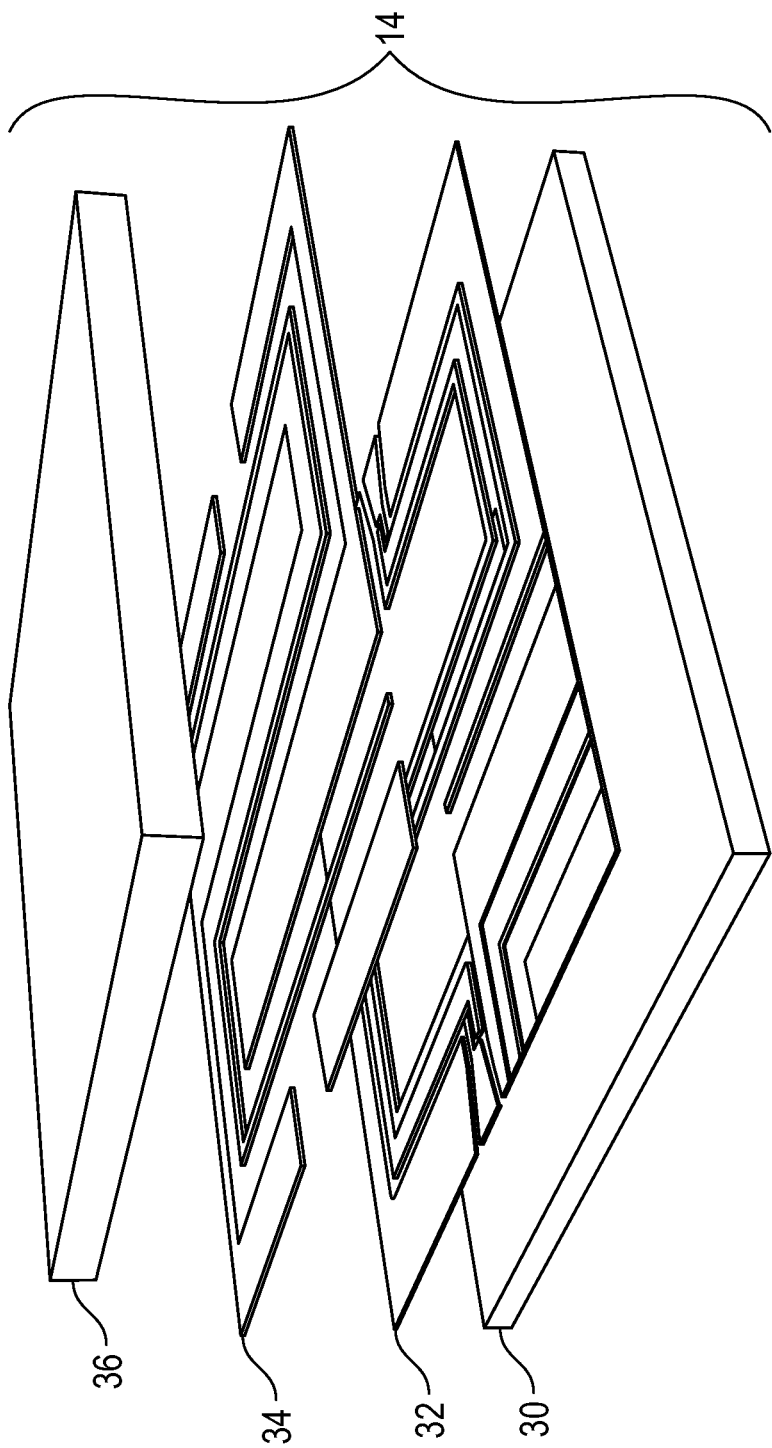
FIG. 1B is a perspective view of the quantum memory 14 illustrated in FIG. 1A.

Referring now to FIG. 1B, the quantum memory 14 is illustrated in further detail. In this example, though quantum memory 14 has a sapphire substrate layer 30. The substrate layer 30 has a superconducting niobium layer 32 that acts as a microwave waveguide resonator. The niobium layer 32 is planar and adjacent to the planar sapphire substrate 30. A silicon nitride optical waveguide layer 34 is disposed on the niobium layer 32. A bulk crystal 36 is disposed on the optical waveguide layer 34. The bulk crystal as described below may be formed from erbium. That is, the bulk crystal 36 may have an erbium ensemble therein. Further implementations may include simpler free space optics and a macroscopic loop gap microwave generator.

Figure 2A:
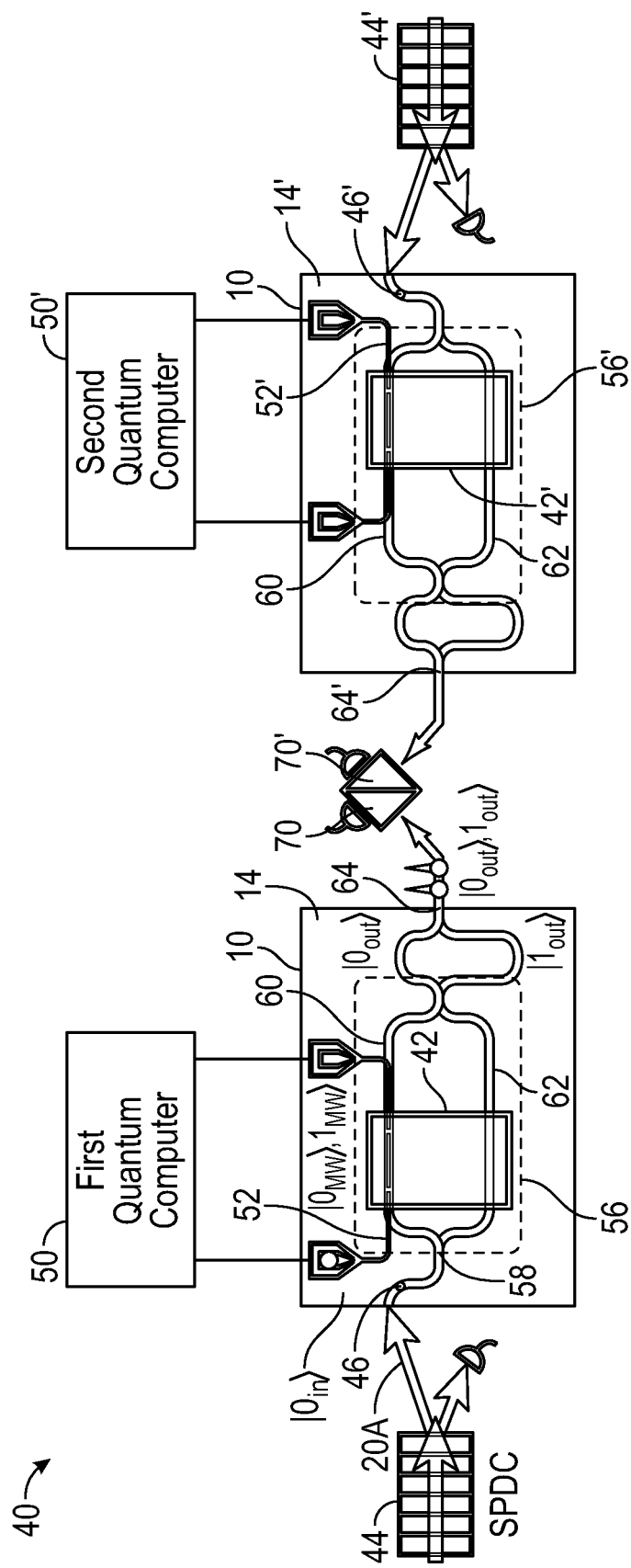
FIG. 2A is a high-level quantum interconnect 40 formed with the quantum modules illustrated in FIG. 1A.

Referring now to FIG. 2A, two quantum modules 10, 10' are illustrated that form a quantum interconnect (QuIC) 40. Each QuIC 40 has a crystal containing ensembles of Kramers-type rare-earth ions at the endpoints of the interconnect, which can be used to distribute and store photonic and microwave entanglement. The use of ensembles in bulk crystals simplifies the fabrication of the devices as no precise placement of individual ions within a host is necessary and increases the microwave got it and optical interaction strengths.

The functionality of each module 10, 10' is based on the electronic structure of the rare earth ions. The rare earth ions feature a four-level ladder scheme of electronic levels where levels 1, 2, 3, 4 have increasing energy. Levels 1 and 2 or preferably level 3 and 4 are electron spin sublevels which are split apart in an external magnetic field. The transition between level 1 and 2 or preferably levels 3 and 4 is a microwave transition whereas the other transitions are optical transitions. The wavelength of the lower of the optical transitions, labeled "signal", is in one of the telecommunication bands, for example the telecom C-band (1530-1565 nm), where optical fiber losses are minimal. This frequency band is also compatible with a variety of quantum systems such as quantum dots, integrated photonic circuits or spontaneous parametric down conversion (SPDC) photon pair sources as well as classical telecom technologies, e.g. allowing for a versatile reconfiguration of the network using optical switches. The wavelength of the second optical transition, labeled "control", can be anywhere in the optical spectrum and a variety of options may exist in each type of rare-earth ion depending on the choice of electronic states. For example if $Er^{3+}$ doped yttrium orthosilicate (YSO) is used, the "signal" transition from state 1 to state 2 is at 1540 nm and further higher-lying transitions for the proposed scheme exist for example at wavelengths around 800-850 nm, conveniently accessible with Ti:sapphire lasers. Possible transitions to various other excited states exist (e.g. 1700 nm, 2800 nm). The frequency of the microwave transition is compatible with microwave-based quantum systems such as superconducting qubits around 5 GHz and can be tuned by changing the external magnetic field strength. The magnetic field can also be applied by depositing an additional ferromagnetic layer directly onto the crystal or substrate. The preferred level arrangement is displayed in FIG. 3 relative to Erbium. The system of levels 1, 2, 3 (or 2, 3, 4) connected via two optical transitions forms an optical quantum buffer or memory. A telecom "signal" photon can be read into this buffer via off-resonant two-photon absorption, aided by the application of a strong classical "control" field. Both fields are hereby detuned from the intermediate electronic level to avoid resonant absorption and can be co- or counter-propagating. The "signal" hereby couples to the lower, thermally populated state, whereas the "control" couples to the upper transition. Both fields are one-photon detuned from the intermediate level but are in two-photon resonance with each other.

Figure 3:
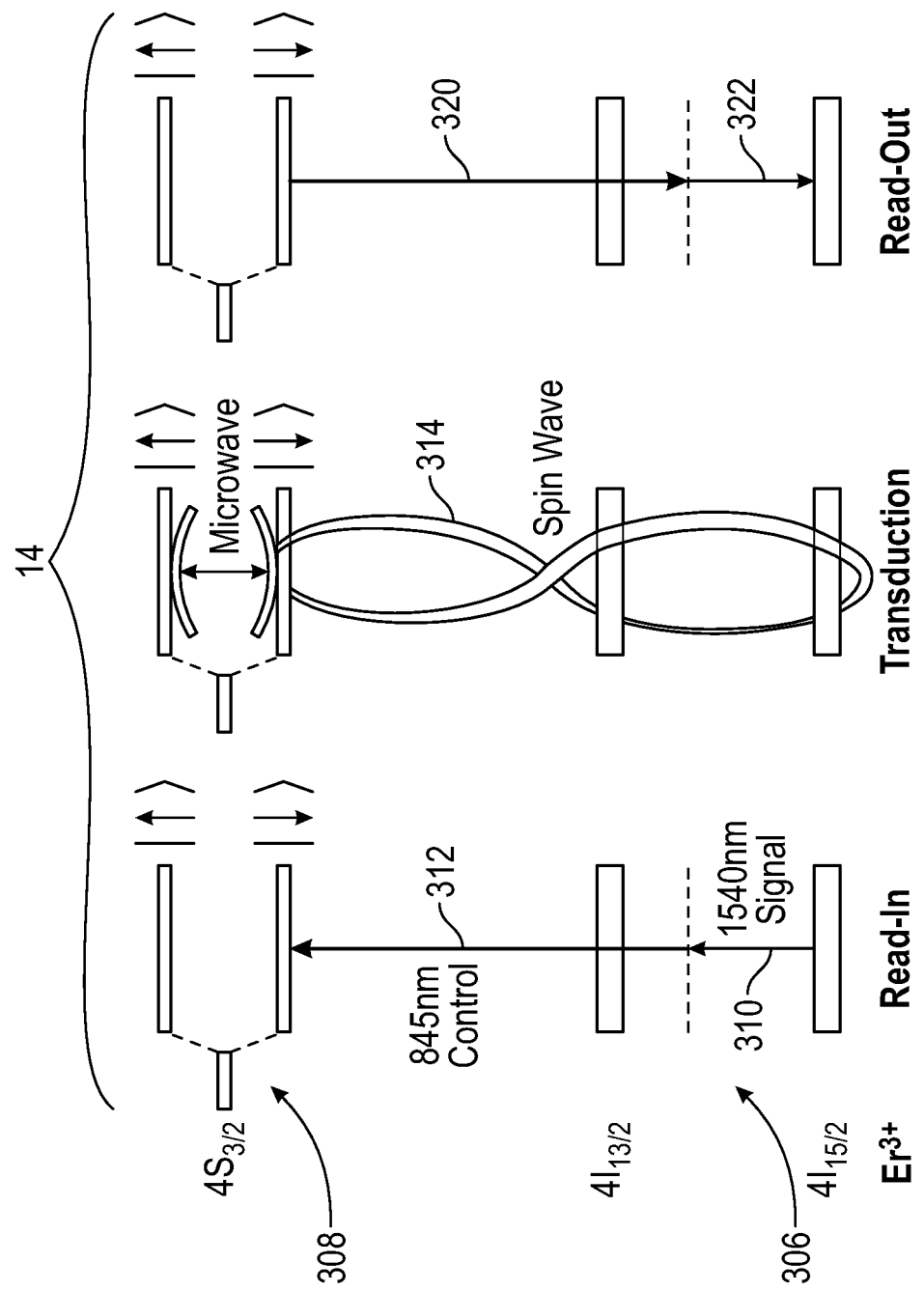
FIG. 3 is representation of the electronic structure and electron spin-sublevels of the rare earth ions used to implement the QB and nonlinearity.

FIG. 3 shows the optical Quantum buffer (QB) or Quantum memory (QM) layout. Two energy levels 306 and 308 are illustrated. The arrangement creates a coherent excitation of the transition between state 1 and 3 (or 2 and 4) such that the atomic ensemble stores the signal in a coherent excitation commonly called spin wave. A read-in of a telecom photon 310 aided by strong control pulse 312 creates stationary spin wave 314 which can be coupled to the microwave field in cavity via excited state spin, imposing a phase shift to the spin wave. The shifted spin wave 322 can then be read out by applying a second control pulse 320 to the quantum memory 14. In contrast to other QM protocols, the present system is inherently noise free due to the large frequency difference of signal and control, preventing e.g. four-wave mixing noise and control field leakage. In addition, it does not require preparation via optical pumping as the QB is thermally initialized in its ground state. Finally, this protocol can reach GHz bandwidths, only limited by the intermediate state detuning and two-photon couplings. By applying a second "control" pulse within the coherence time of the buffer and while a signal is stored in the buffer, coherent re-emission is stimulated and the "signal" is read out of the buffer. This part of the proposed QuIC 40 is inspired by a quantum memory in a three-level ladder scheme, demonstrated in warm cesium (Cs) as described in U.S. Pat. No. 10,600,48262 the disclosure of which is incorporated by reference herein, which however is preferably implemented in atomic alkali vapor, does not utilize the electron spin degree of freedom, does not utilize a fourth level, and thus does not have MW-optical interconnect capability. Moreover, the present examples use a solid-state rare earth ensemble that has a number of technical advantages over the QM in atomic vapors. The solid-state ensemble enables larger optical depths and photonic waveguides can be used to achieve strong optical mode confinement, both improving the efficiency compared to atomic vapors. Additionally, while this type of storage is fundamentally limited by spontaneous emission and non-radiative decay of state 3 (or 4), excited state lifetimes in rare earths are extremely long with achievable storage times reaching microseconds in commercial materials. Even longer storage times reaching milliseconds are conceivable custom stoichiometric low-phonon materials like ErCl3, corresponding to hundreds of kilometers of quantum link length. Using two or more of these quantum memory (QM) modules 14, 14' at multiple endpoints of a quantum network enables the establishment of an optical quantum communication channel. Entanglement between optically active quantum systems linked to the optical quantum buffers at various endpoints of the network can then be established via heralded absorption of entangled telecom photons from SPDC sources and stored in the quantum buffer (quantum memory). The quantum buffer/memory described above is also capable of single mode storage i.e. only a single input temporal mode will be stored in the memory depending on the shape of the control field, and all modes orthogonal to this will be transmitted without being affected. Using appropriately shaped read-in and read-out control fields, this system therefore acts as a time non-stationary beam splitter and can be used to separate, conditionally store, and manipulate temporal modes of light, i.e., act as a quantum converter. These modes are a useful basis for higher-dimensional encoding of quantum information for increasing information density and fault tolerance, as demonstrated before for similar Raman QMs. A special application of this property is coherent filtering of single photons from various single photon sources which are typically emitted in a mixture of temporal-spectral eigenmodes, limiting their indistinguishability. Using a shaped control field the QM can selectively pick out the most intense eigenmode of such a photon, thereby increasing its indistinguishability, and it has be shown that this process can beat the efficiency limit of classical intensity filters. Moreover, by adjusting the frequency of the read-out control field, a limited amount of frequency conversion (in the nm range) can be achieved, e.g. to deal with spectral diffusion of a single photon source.

Furthermore, this device can add memory-assisted quantum state transfer capabilities between remote microwave-based quantum systems via the optical link. This is achieved by coupling a microwave photon inside a cavity to the stationary excitation of the optical QB via the microwave transition between states 3 and 4 (or 1 and 2 but preferably between 3 and 4 to minimize spin-spin interactions with neighboring ions and maximize coherence times). To implement this a magnetic field is applied to the $Er^{3+}$ ensemble to split the individual spin sublevels via the Zeeman interaction. The resulting magnetic dipole transition in the excited and ground states can be addressed separately due to a difference in g-factors between ground and excited states and cavity-coupled to a weak microwave field as shown in FIG. 3. To use this to entangle two distant microwave-based systems, hybrid microwave-optical entanglement is first generated locally in both quantum modules 10 that form the QuIC 40. To do so, each QuIC 40 is coupled to a telecom photon source 44, 44' such as an SPDC source. A telecom signal photon 46, 46' is read into each optical memory of the quantum memory 14, 14' as described above. If a photon pair source such as an SPDC source is used, the idler photon of this source 44, 44' can be detected and serves as a herald indicating that the QB is now charged. The interaction of the quantum memory 14, 14' with the microwave photon from a microwave source such as a first superconducting quantum computer 50 and a second superconducting quantum computer 50' results in a phase shift of the optical photon via an AC (time-varying) Stark shift, analogous to purely optical single-photon level nonlinearities proposed for photonic QIP. The quantum computers 50, 50' may be a telecom source. The first quantum computer 50 is coupled to a microwave resonator 52. The second quantum computer 50' is coupled to the second microwave resonator 52'.

The photons 46, 46' are coupled to an interferometer 56,56' In this example, the interferometers 56, 56' are Mach-Zehnder interferometers. The interferometers 56, 56' are formed in active regions of the crystal 42, 42'. Each interferometer 56, 56' has an input 58, 58' that received the photons 46, 46' from the respective photon sources 44, 44'. The inputs 58 correspond to the optical input 20A. From the input 58, 58', the optical path is split into a first arm 60, 60' and a second arm 62, 62' corresponding to respective active regions of the interferometer 56, 56'. The first arm 60, 60, is also adjacent to the coplanar waveguide microwave resonator 52, 52' of the which can allow the state photon 46, 46' to be changed using phase shift as described below.

Figure 2B:
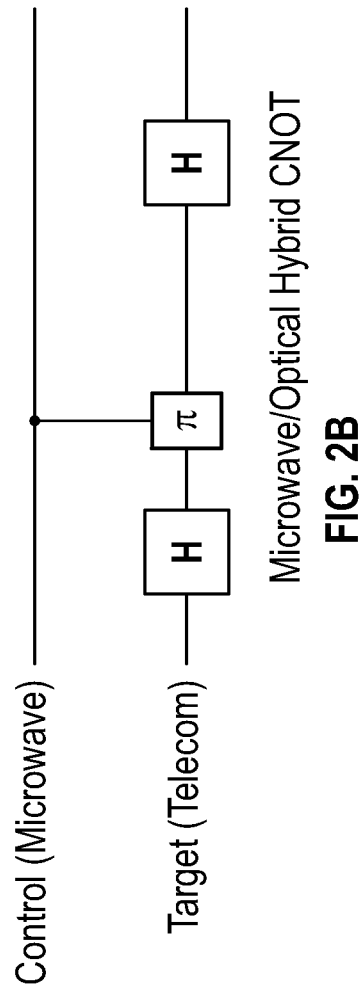
FIG. 2B is an optical shifting as controlled by a microwave as described in the present disclosure.

To turn this phase shift into an entangling operation a hybrid microwave (control) optical (target) controlled-NOT (CNOT) gate is implemented, by operating the quantum memory 14 in the dual-arm configuration and integrating it into both arms of the interferometer 56, 56' with input |0⟩ in, of which only one arm 60, 60, is coupled to the microwave resonator 52, 52' as shown in FIG. 2A. The first beam splitter of the interferometer 56, 56' performs a Hadamard gate H (of FIG. 2B) and maps the single telecom photon in a coherent superposition of both interferometer arms. This superposition state is then stored by the dual rail quantum memory. After reading out the quantum memory the input photon is then mapped into one of two spatial output modes |0⟩ out or |1⟩ out by the second beam splitter of the interferometer depending on whether a $\pi$ phase shift was applied via the interaction of the QM with a microwave photon. If no microwave photon is present |10⟩ MW), no phase shift is applied and a photon in input mode |0⟩ in is mapped to output mode |0⟩ out after QM readout. If a $\pi$ phase shift is applied as illustrated in FIG. 2B to the first arm 60, 60' by the presence of a microwave photon in the microwave resonator 52 (|0⟩ MW), the mode of the input photon 46 is swapped and it leaves in |1⟩ out.

Hence, if the microwave photon is in a superposition $1/\sqrt{2}(|0\rangle$ MW+|1⟩ MW), the combined system is projected into the Bell state $|\Phi^+\rangle = 1/\sqrt{2}$ (|0MW0OUT⟩ + |1MW1OUT⟩ ) by the CNOT operation. The quantum state in both output modes can then be encoded in a variety of bases, such as the robust time bin encoding shown in FIG. 2A. Entanglement swapping can then be accomplished by performing a Bell state measurement on the optical photons retrieved from two distant QuIC modules, establishing entanglement between the two distant microwave photons. The phase shift achieved is governed by the Er magnetic properties and transition linewidth, microwave resonator parameters, and optical storage time. The obtainable phase shift is tuned using homodyne detection of the optical field retrieved from the memory. Importantly, the stationary character of both fields allows the present system to overcome the limits of conventional travelling-wave cross-Kerr-nonlinearities caused by their causal, non-instantaneous behavior. To achieve a phase shift of $\pi$ shown in FIG. 2B, necessary to implement the scheme described above, a cavity Q-factor of $10^4$ (f=4.5 GHz, 2 g=2$\pi$·68 MHz) is necessary. Such values are technically achievable and have already been reported. Moreover, the QBs in both QuICs can be used to synchronize the Bell state measurement. The advantage of the present system over classical transduction schemes is two-fold. First, the generation of hybrid microwave-optical entanglement is based on heralded absorption of a telecom photon in the QM, enabling a repeat-until-success strategy. The probabilistic nature of this process only limits the rate, but not overall efficiency, and the broadband nature of the optical QM enables high-rate entanglement generation. Secondly, interaction of a quasi-stationary intra-cavity microwave field with the stationary spin-wave of the optical QM promises high microwave-to-optical coupling. Due to the long microwave-cavity lifetime and the large quantum memory bandwidth, even the interaction of a single microwave photon with multiple consecutive optical photons or the interaction of a single stored optical photon with multiple subsequent microwave photons is feasible. The device can be realized with varying levels of integration. This ranges from free space optical fields focused into and out of a bulk crystal embedded in a macroscopic loop-gap microwave resonator or in close proximity with a relatively simple microwave strip-line to a fully integrated hybrid device. The latter device utilizes optical waveguides fabricated onto a thin slap of Er-containing crystal or a separate substrate the crystal can be placed on (flip-chip), using a high-refractive index material capable of guiding both signal and control fields (e.g. Si3N4) and on-chip superconducting coplanar waveguide (CPW) resonators e.g. made from Nb on a substrate such as sapphire. The hybrid chip is housed in a hermetically (indium O-ring) sealed microwave sample box with SMA input/output coupling ports to avoid the presence of parasitic box- and slot-modes near the transition frequencies of the QuIC microwave transitions. The modular nature of the interconnect is advantageous as it allows for the optical signals to be located away from the superconducting qubit devices. This is important because optical photons incident on superconducting qubits will create above-gap quasiparticles that will poison their coherence. Deleterious photon-induced effects in the planar superconducting resonators within the interconnect enclosure are also further mitigated by the QB which allows separation of the optical and microwave pulses in time, thereby allowing sufficient time for any photon-generated quasiparticles to relax before microwave pulses are applied. The modular nature of the interconnect also facilitates its placement in an external magnetic field, which must be kept away from the low-magnetic field environment needed for superconducting qubits. Planar devices are particularly advantageous since the microwave coupling requires the application of a small (~30 mT) magnetic field, which can be oriented in the plane of the resonator to avoid degradation of its quality factor. In fact, niobium resonators have been demonstrated to maintain quality factors $Q>2\times10^4$ when subjected to an in-plane field of 0.2T, corresponding to an electron Larmor frequency of ~5.5 GHz. This is expected to be sufficient for the coupling of $Er^{3+}$ which is an ideal system due to its high magnetic dipole moment of about 15 $\mu$B. The QuIC 40 can be in the same cryogenic environment as the superconducting qubit system, which will enable the use of cryogenic low-loss coaxial cables (NbTi inner and outer conductor) to transfer the microwave quantum state of the superconducting qubits to the microwave resonators within the QuIC 40.

Figure 4:
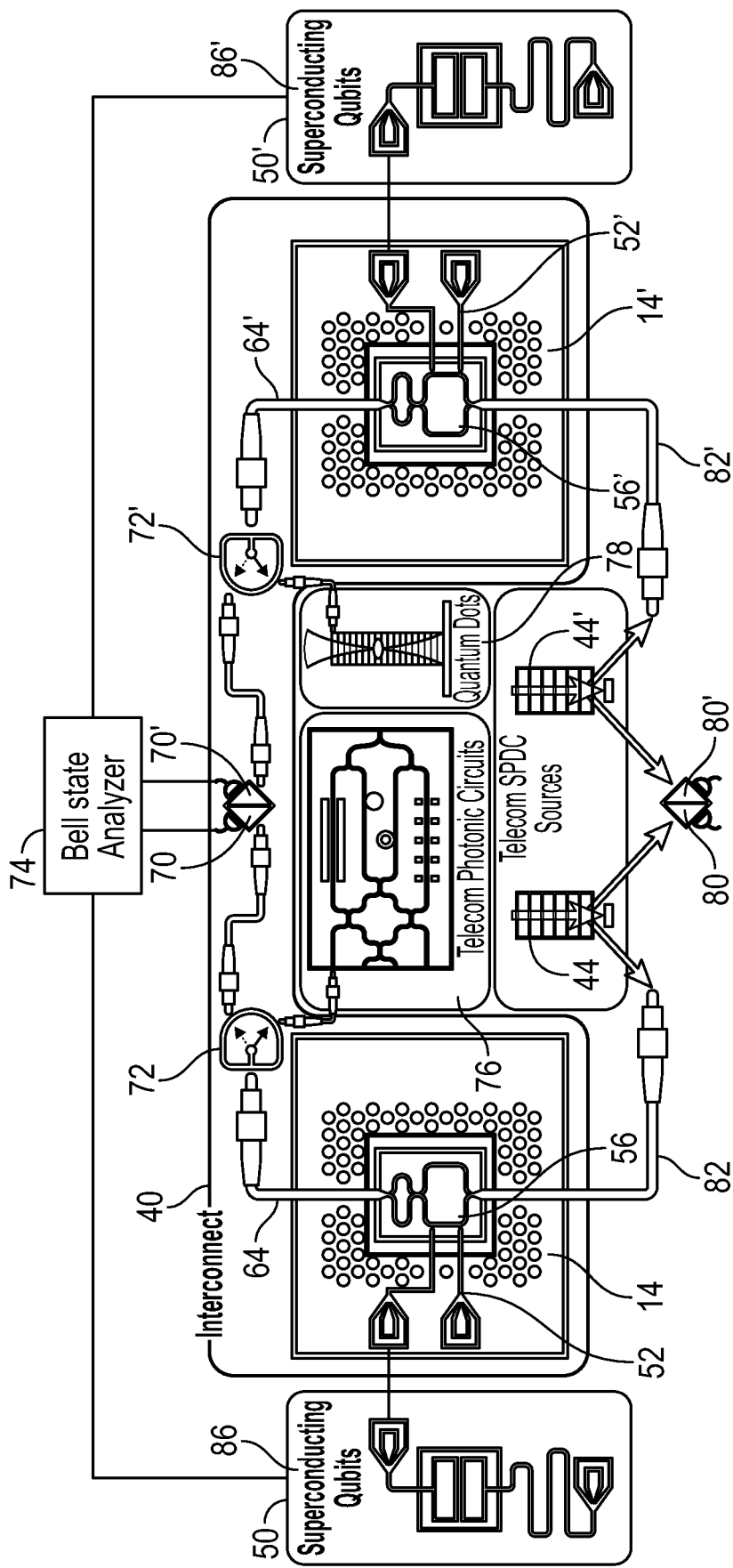
FIG. 4 is a detailed schematic view of a quantum interconnect interconnecting with microwave and telecom based quantum systems in a hybrid quantum landscape.

Referring now to FIG. 4, a schematic representation of the quantum interconnect and integration in hybrid quantum system is set forth in a telecom implementation. Two rare-earth ensembles, optically connected in the telecom C-band, serve as the quantum interconnect QuIC 40.

The optical output 64, 64' are coupled to optical detectors 70, 70' and correspond to the output 20B in FIG. 1A. That is, the outputs 64 from the interferometers 56 and the output 64' from 56' are overlapped on a 50/50 optical beam splitter and both simultaneously coupled to optical detectors 70 and 70' at both beam splitter output ports. The details of the quantum interconnect 40 are illustrated in further detail. In this example, the interaction with a telecom system is illustrated. The output 64, 64' of each of the quantum memories 14, 14' may be coupled to an optical switching network 72 to establish a reconfigurable network between multiple modules. The optical detectors 70, 70' convert the optical signals into electrical signals that are communicated to a photon counting electronics attached to a classical computer. Entanglement of remote modules is then performed via a Bell measurement which means by observing a specific sequence of photon counting events on both detectors (e.g. a photon in the short and a photon in the late time bin). The Bell measurement is a joint quantum-mechanical measurement of two qubits that determines which of four Bell states the two qubits are in. This sequence may be repeated multiple times until the correct sequence of photon detection events signaling the desired Bell state has been detected.

That is, the quantum interconnects 40, 40' are associated with respective quantum computers 50, 50'. The quantum computers 50, 50' may be entangled based on the Bell measurement determined in the Bell state analyzer 74. Multiple quantum memories 14, 14' may be coupled together as needed so that larger quantum computing systems are formed.

As mentioned above, optical switches 72 may route the optical signals to form reconfigurable optical networks between multiple superconducting quantum computers. The optical QMs in interconnect quantum memory modules 14,14' are also compatible with various telecom quantum applications such as telecom quantum photonic circuit 76 and telecom quantum dots 78. Therefore, the quantum memory modules 14, 14' can also be used to synchronize optical photons from these purely-optical quantum technologies or to establish entanglement between disparate systems (e.g. a superconducting quantum computer and a photonic quantum processor).

The photon sources 40, 44' are coupled to the quantum memories 14, 14' through optical fibers 82, 82'.

Figure 5:
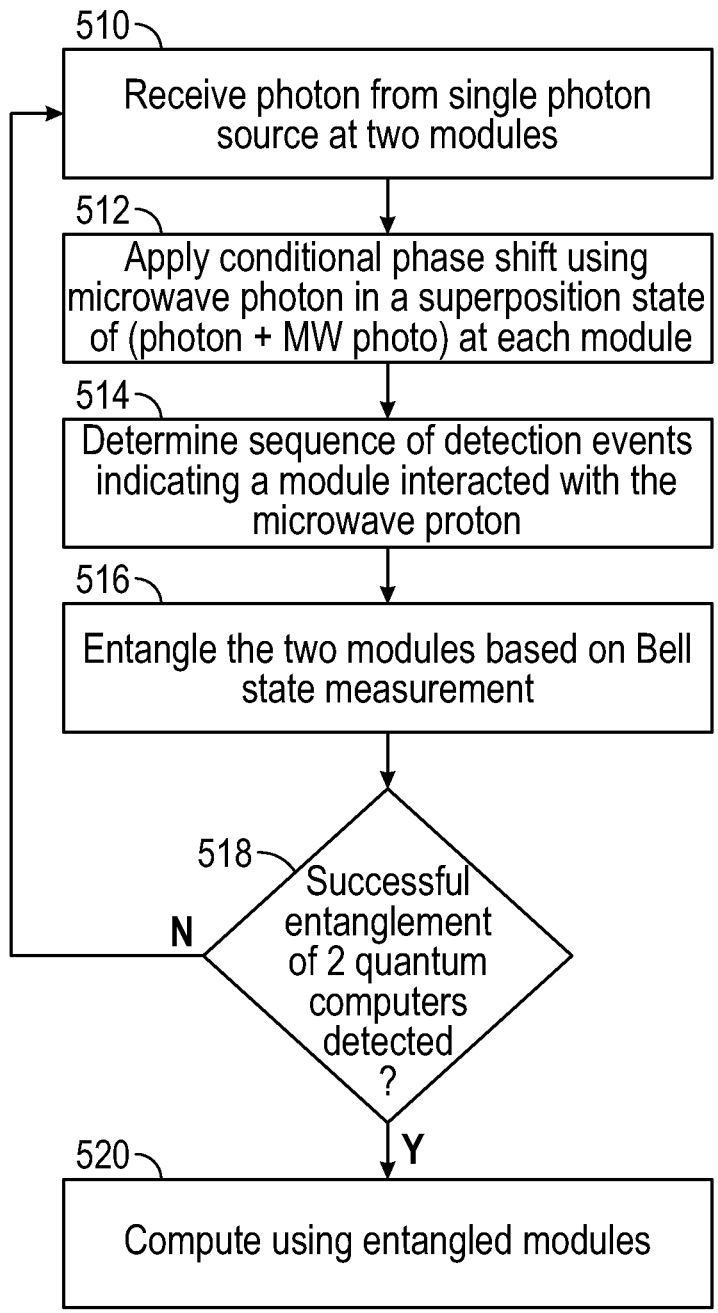
FIG. 5 is a flowchart of a method for operating the quantum interconnect to remote-entangle microwave-based quantum systems.

Referring now to FIG. 5, a method for interconnecting quantum computers is set forth. In step 510, photons from single photon sources 44, 44' may be communicated from telecom sources and are communicated to the quantum modules 10, 10' and the quantum memories 14, 14' therein. In step 512, an interferometer such as a Mach-Zehnder interferometer is operated in a dual-arm configuration. A phase shift is applied to one arm of the dual arm interferometer from microwave photons (e.g. superconducting qubit sources 86, 86') from two quantum computers 50, 50'. Each of the microwave photons may be communicated from different quantum computers which are ultimately entangled by the process. Ultimately, the output of the quantum memories 14, 14' are communicated to the Bell state analyzer 74 which measures the Bell state on the photons from the two different quantum modules 10, 10' and the quantum memories 14, 14' associated therewith. In step 514, a specific sequence of photon detection events is determined at the Bell state analyzer. The specific sequence of detection events indicates that one of the modules interacted with a microwave photon (but which one is not known). This measurement projects the combined system into a Bell state of $1/\sqrt{2}*((\text{No MW, Output 0})+(\text{MW, Output 1}))$. This Bell state or EPR pair is an example of quantum entanglement between two systems (the two MW modes). Ultimately, the Bell state analyzer 74 entangles the two modules and the quantum computers 50, 50' associated therewith in step 516 based on the Bell measurement (e.g. by looking for the specific sequence of photon detection events. The sequence of steps 510 to 516 may be repeated at step 518 until the desired Bell state indicating successful entanglement of both quantum computers is detected. That is, when no entanglement is detected in step 518, steps 510-518 are repeated. When entanglement is detected in step 518, step 520 is performed. In step 520, the quantum computers 50, 50' are entangled and can perform simultaneously computations together.

The optical switching networks enable integration of various quantum systems and entanglement distribution via heralded photon absorption, e.g., from SPDC sources. Both QMs are integrated in microwave cavities for optically-assisted microwave quantum state transfer to link superconducting qubits.

In conclusion, the scheme and designs outlined above describe a QUIC 40 device and flexible QuIC architecture which enables modular quantum processors and local (potentially on chip) or metropolitan scale quantum networks. By performing all of the functionalities described above in the same device and at telecoms wavelengths, a significant reduction in losses related to additional interfaces, for example, lossy optical frequency conversion, can be achieved compared to other potential platforms and the QuIC 40 is inherently compatible with a significant number of microwave and telecom-wavelength quantum systems.

Even longer coherence times of more than a second have been demonstrated for the ground states of rare earths if operated under specific conditions. Hence, optionally if long-term storage is desired, optical mapping of the spin wave described above into and out of a system of long-lived ground states can be achieved if the initial memory bandwidth is limited to several MHz, while still benefitting from the noise-free nature of our basic protocol described above.

The flip-chip techniques described above provide a natural way to directly integrate superconducting qubits with the described QuIC on-chip into a single hybrid device.

Rare earth doped crystals have a tradeoff between high concentrations of the dopant, which is advantageous to increase the coupling strength, and low inhomogeneous line widths, since increasing the concentration adversely affects the crystalline quality and Stark shifting results from electronic dipole-dipole interactions. To overcome this, the proposed QuIC may use stoichiometric Er crystals, which give a maximum Er concentration without tradeoff in the crystalline quality, as the Er is a part of the host crystal itself. Although there are no commercially available stoichiometric Er crystals, very low optical linewidths (25 MHz) have been demonstrated in $EuCl_3 \cdot 6H_2O$ grown from solution and $ErCl_3 \cdot 6H_2O$ solution-grown crystals are expected to have similarly narrow linewidths, and have been proposed for cascaded optical to microwave conversion. One drawback to using rare earth transitions in hydrated crystals is that they exhibit strong non-radiative decay due to the OH-radical phonon modes, as reported for Eu crystals, and this effect is significantly worse for Er and most other rare earths, where smaller optical energy gaps make it even more pronounced. Therefore, anhydrous crystals grown by e.g. the Bridgman-Stockbarger method, which has been demonstrated, for example, for the growth of $ErCl_3$ crystals investigated for laser source applications, may instead be used in the described QuIC 40. Moreover, in contrast to compounds like Er:YSO with low Er doping levels, stoichiometric crystals like $ErCl_3$ orders ferromagnetically at temperatures below 350 mK due to shorter Er—Er distances enabling stronger exchange interactions. This opens up the possibility to excite magnetostatic magnon modes, which is expected to drastically increase microwave coupling even further and microwave coupling strengths on the order of 1.6 GHz have been predicted using $ErCl_3 \cdot 6H_2O$ even in standard loop-gap resonators, further increasing the achievable nonlinearities. Two active regions of the crystal have the two arms of the interferometer formed therein.

Should a standard (50Ω) resonator not suffice, the magnetic field resilience of a planar structure can be further enhanced by using a high-kinetic inductance resonator, providing even stronger coupling.

Another possible route for producing the magnetic field needed to quantize the spin states in the QM is via the direct incorporation of strong ferromagnetic islands sputtered directly onto the flip-chip substrate or the QM material. This approach has the benefit of being able to miniaturize the QM device without the inclusion of a larger solenoid for generating the field. In particular, Nd2Fe14B, is the strongest known permanent magnetic material. The fringing field from an island several microns in size will produce a field up to 0.1 T directly above it at a distance of 500 nm. There are well established techniques for micro-fabricating and sputtering thin films of Nd2Fe14B. By controlling the substrate temperature, the Nd2Fe14B islands will be polarized normal to the substrate surface.

The relaxation of quasiparticles can be enhanced via the incorporation of normal metal (Cu) traps on the ground plane of the CPW resonators, which have been shown to reduce quasiparticle losses by more than an order of magnitude.

To further enhance the coupling between the optical quantum buffer and the signal/control fields, the buffer may be embedded in an optical cavity. This could for example be achieved by fabricating a photonic crystal cavity into the optical waveguiding layer.

Isotopically purified rare earth crystals may be used to further enhance the device performance, for example either by providing narrower optical/spin linewidths or by enabling operation at zero external magnetic fields. To this end, 167-Er is a promising isotope to consider as it offers hyperfine splittings in the GHz range, potentially enabling coupling to superconducting qubits without the need to apply an external magnetic field. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A quantum interconnect module comprising:
 a quantum memory comprising a dual arm interferometer embedded therein, said dual arm interferometer comprising a first arm within a crystal and a second arm within the crystal, said interferometer coupled to a photon source;
 a microwave resonator comprising a waveguide coupled to a microwave source, said microwave resonator coupled to the first arm of the quantum memory; and
 said interferometer generating an output based the microwave source.

2. The quantum interconnect module of claim 1 wherein the crystal comprises a rare earth ion crystal.

3. The quantum interconnect module of claim 1 wherein the waveguide is deposited onto the crystal.

4. The quantum interconnect module of claim 1 wherein the crystal is deposited on a first substrate and the waveguide is formed on a second substrate separate from the first substrate.

5. The quantum interconnect module of claim 1 wherein the waveguide comprises a superconducting waveguide.

6. The quantum interconnect module of claim 1 wherein the microwave resonator comprises a coplanar waveguide microwave resonator.

7. The quantum interconnect module of claim 1 wherein the microwave resonator comprises a macroscopic loop-gap resonator.

8. The quantum interconnect module of claim 1 wherein the crystal comprises rare earth ions having half-integer spin.

9. The quantum interconnect module of claim 1 wherein the crystal comprises Erbium ions.

10. The quantum interconnect module of claim 1 wherein the crystal comprises Kramer-type ions.

11. The quantum interconnect module of claim 1 wherein the photon source comprises a telecom photon source.

12. A quantum interconnect system comprising:
- a first quantum interconnect module of claim 1 comprising a first output, said first quantum module associated with a first quantum computer;
- a second quantum interconnect module of claim 1 comprising a second output, said second quantum module associated with a second quantum computer;
- a detector converting the first output to a first electrical signal and the second output to a second electrical signal; and
- a Bell state analyzer entangling the first quantum computer and the second quantum computer based on the first electrical signal and the second electrical signal.

13. The quantum interconnect system of claim 12 wherein the Bell state analyzer entangles the first quantum computer and the second quantum computer based on a Bell measurement using a specific sequence of photon detection events from the first electrical signal and the second electrical signal.

14. A method comprising:
- communicating a first photon into a first quantum memory having a first dual arm interferometer, said first dual arm interferometer comprising a first arm and a second arm formed within a crystal; and
- controlling a first microwave resonator comprising a first waveguide coupled to a first microwave source and the first arm of the quantum memory,
- generating a first output at the first interferometer based on the first microwave source.

15. The method of claim 14 wherein controlling the first resonator comprises controlling the first resonator by applying a microwave photon thereto to form a conditional phase shift in the first arm.

16. The method of claim 14 further comprising communicating a second photon into a second quantum memory having a second dual arm interferometer, said second dual arm interferometer comprising a third arm and a fourth arm formed within a second crystal;
- controlling a second microwave resonator comprising a second waveguide coupled to a second microwave source and the third arm of the second interferometer; and
- generating a second output at the second interferometer based controlling the second microwave resonator.

17. The method of claim 16 further comprising generating a Bell measurement based on the first output and the second output.

18. The method of claim 17 further comprising entangling a first quantum computer associated with the first quantum memory and a second quantum computer associated with the second quantum memory based on the Bell measurement.

19. The method of claim 18 wherein communicating the first photon comprises communicating the first photon from a first telecom source and communicating the second photon comprises communicating the second photon from a second telecom source.

* * * * *